(12) United States Patent
Ratts et al.

(10) Patent No.: US 11,566,554 B2
(45) Date of Patent: Jan. 31, 2023

(54) ENGINE MULTI-PATH AFTERTREATMENT SYSTEM WITH RADIO FREQUENCY SENSORS AND METHODS, ASSEMBLIES, AND COMPONENTS THEREOF

(71) Applicant: Caterpillar Inc., Peoria, IL (US)

(72) Inventors: Joshua L. Ratts, East Peoria, IL (US); Tyler V. Richards, Parker, CO (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/199,475

(22) Filed: Mar. 12, 2021

(65) Prior Publication Data
US 2022/0290602 A1   Sep. 15, 2022

(51) Int. Cl.
| | |
|---|---|
| *F01N 9/00* | (2006.01) |
| *F01N 3/021* | (2006.01) |
| *F01N 13/00* | (2010.01) |
| *B01D 46/44* | (2006.01) |
| *B01D 46/58* | (2022.01) |

(52) U.S. Cl.
CPC ............ *F01N 9/00* (2013.01); *B01D 46/442* (2013.01); *B01D 46/58* (2022.01); *F01N 3/021* (2013.01); *F01N 13/0093* (2014.06); *B01D 2267/30* (2013.01); *B01D 2279/30* (2013.01); *F01N 2900/1406* (2013.01); *F01N 2900/1606* (2013.01); *F01N 2900/1611* (2013.01)

(58) Field of Classification Search
CPC ........ F01N 9/00; F01N 3/021; F01N 13/0093; F01N 2900/1406; F01N 2900/1606; F01N 2900/1611; B01D 46/442; B01D 46/58; B01D 2267/30; B01D 2279/30
See application file for complete search history.

(56) References Cited

U.S. PATENT DOCUMENTS

| | | | | |
|---|---|---|---|---|
| 5,157,340 | A * | 10/1992 | Walton | ............... F01N 9/002 |
| | | | | 324/641 |
| 7,157,919 | B1 | 1/2007 | Walton | |
| 7,171,801 | B2 * | 2/2007 | Verkiel | ............ F01N 3/0231 |
| | | | | 60/286 |
| 8,470,070 | B2 | 6/2013 | Kulkarni et al. | |
| 8,833,063 | B2 | 9/2014 | Snopko et al. | |
| 9,399,185 | B2 | 7/2016 | Bromberg et al. | |
| 9,797,285 | B2 * | 10/2017 | Justin | ............... F01N 3/0211 |
| 10,036,294 | B2 | 7/2018 | Garduno et al. | |
| 10,060,320 | B2 | 8/2018 | Blomgren et al. | |

(Continued)

*Primary Examiner* — Matthew T Largi
(74) *Attorney, Agent, or Firm* — Xsensus, LLP

(57) ABSTRACT

Systems, methods, assemblies, and components for aftertreatment of an engine can comprise an aftertreatment module including an exhaust enclosure with at least one inlet port to receive exhaust gas, an outlet port to output exhaust gas, a first compartment, and a second compartment; a plurality of particulate filters extending in parallel with each other within the exhaust enclosure such that, for each of the particulate filters, an inlet of the particulate filter is in the first compartment and an outlet of the particulate filter is in the second compartment; and at least one radio frequency (RF) sensor set including an RF transmitter assembly and an RF receiver assembly. The RF transmitter assembly can be provided in the first compartment at the inlet of one of the particulate filters, and the RF receiver assembly can be provided at the outlet of said one particulate filter.

18 Claims, 5 Drawing Sheets

(56) References Cited

U.S. PATENT DOCUMENTS

| | | |
|---|---|---|
| 10,168,358 B2 | 1/2019 | Sappok et al. |
| 10,428,707 B2 * | 10/2019 | Fritz .................... F01N 13/011 |
| 10,436,089 B2 | 10/2019 | Khaled et al. |
| 10,799,826 B2 * | 10/2020 | Sappok .................. F01N 11/00 |
| 2007/0024289 A1 * | 2/2007 | Knitt ................ G01N 15/0618 |
| | | 324/639 |
| 2011/0030343 A1 | 2/2011 | Kiser et al. |
| 2012/0003131 A1 * | 1/2012 | Ibrahim .............. F01N 3/0275 |
| | | 423/212 |
| 2012/0304861 A1 * | 12/2012 | Lim .................... F01N 3/0222 |
| | | 95/286 |
| 2013/0008308 A1 * | 1/2013 | Govindappa ...... F02M 35/0215 |
| | | 95/20 |
| 2015/0240681 A1 * | 8/2015 | Fritz .................... F01N 13/011 |
| | | 60/288 |
| 2020/0300137 A1 * | 9/2020 | Chenoweth ............... F01N 3/10 |
| 2020/0333264 A1 | 10/2020 | Sappok et al. |

* cited by examiner

ENGINE MULTI-PATH AFTERTREATMENT SYSTEM WITH RADIO FREQUENCY SENSORS AND METHODS, ASSEMBLIES, AND COMPONENTS THEREOF

TECHNICAL FIELD

The present disclosure relates to engine aftertreatment, and more particularly to engine aftertreatment systems with a multi-pass or -path aftertreatment module and one or more radio frequency (RF) sensors, and methods, assemblies, and components thereof.

BACKGROUND

An aftertreatment system using a particulate filter may use delta pressure (i.e., particulate filter and physics-based model) to sense soot loading. However, for relatively large engines the delta pressure technique may not be suitably accurate because of lower back pressure limitations.

U.S. Patent Pub. No. 2020/0333264 ("the '264 patent publication") describes a radio state variable measurement system and method. The '264 patent publication describes that one or more radio frequency probes may be installed in a housing to transmit or receive radio frequency signals in the housing. According to the '264 patent publication, the transmitted and received signals may be used to generate and sample one or more resonant modes in a measurement cavity. However, the '264 patent publication is not understood to describe implementing the one or more radio frequency probes in the context of a multi-pass or -path aftertreatment module.

SUMMARY

According to an aspect an aftertreatment module is described or implemented. The aftertreatment module can comprise: an exhaust enclosure with at least one inlet port to receive exhaust gas from an engine, an outlet port to output treated exhaust gas, a first compartment in fluid communication with the inlet port, a second compartment in fluid communication with the outlet port; a plurality of particulate filters extending in parallel with each other within the exhaust enclosure such that, for each of the particulate filters, an inlet of the particulate filter is in the first compartment and an outlet of the particulate filter is in the second compartment; and a radio frequency (RF) sensor set including an RF transmitter assembly and an RF receiver assembly, each of the RF transmitter assembly and the RF receiver assembly having a housing and an antenna. The RF transmitter assembly can be provided in the first compartment at the inlet of one of the particulate filters, and the RF receiver assembly can be provided at the outlet of said one particulate filter. The aftertreatment module can be configured to process the exhaust gas such that a flow of the exhaust gas passes from the first compartment to the second compartment via the plurality of particulate filters in parallel with each other.

In another aspect a method implementing a multi-pass aftertreatment module is disclosed or implemented. The method can comprise: providing an exhaust enclosure of the multi-pass aftertreatment module, the exhaust enclosure including an inlet port to receive exhaust gas from an engine, an outlet port to output treated exhaust gas, a first chamber in fluid communication with the inlet port, and a second chamber in fluid communication with the outlet port; providing a plurality of particulate filters of the multi-pass aftertreatment module arranged in an array of at least one row and multiple columns or multiple rows and at least one column, the particulate filters extending in parallel with each other within the exhaust enclosure such that, for each of the particulate filters, an inlet of the particulate filter is in the first chamber and an outlet of the particulate filter is in the second chamber; and providing a plurality of radio frequency (RF) sensor sets each comprised of an RF transmitter and an RF receiver. The first chamber and the second chamber can be in fluid communication with each other via only the plurality of particulate filters, and the RF transmitters can be provided in the first chamber at respective inlets of corresponding particulate filters. The RF receivers can be provided in the second chamber at respective outlets of said corresponding particulate filters.

And in another aspect an engine aftertreatment system is disclosed or provided. The engine aftertreatment system can comprise: electronic control circuitry; and an exhaust system to receive exhaust gas output from an internal combustion engine. The exhaust system can have a multi-path aftertreatment module that includes: an exhaust enclosure with an inlet port to receive the exhaust gas from the internal combustion engine via a first exhaust conduit downstream of the internal combustion engine, an outlet port to output treated exhaust gas to a second exhaust conduit downstream of the internal combustion engine, a first compartment in fluid communication with the inlet port, a second compartment in fluid communication with the outlet port, and a divider between the first compartment and the second compartment, a plurality of particulate filters extending in parallel with each other within the exhaust enclosure such that, for each of the particulate filters, an inlet of the particulate filter is in the first compartment and an outlet of the particulate filter is in the second compartment, and a radio frequency (RF) sensor set operatively coupled to the electronic control module and comprised of an RF transmitter assembly and an RF receiver assembly, each of the RF transmitter assembly and the RF receiver assembly having a housing and an antenna. The RF transmitter assembly can be provided in the first compartment at the inlet of one of the particulate filters and not the inlets of any of the other particulate filters, and the RF receiver assembly can be provided at the outlet of said one particulate filter and not the outlets of said other particulate filters.

Other features and aspects of this disclosure will be apparent from the following description and the accompanying drawings.

DETAILED DESCRIPTION

The present disclosure relates to engine aftertreatment, and more particularly to engine aftertreatment systems with a multi-pass or -path aftertreatment module and one or more radio frequency (RF) sensors, and methods, assemblies, and components thereof.

Figure 1:
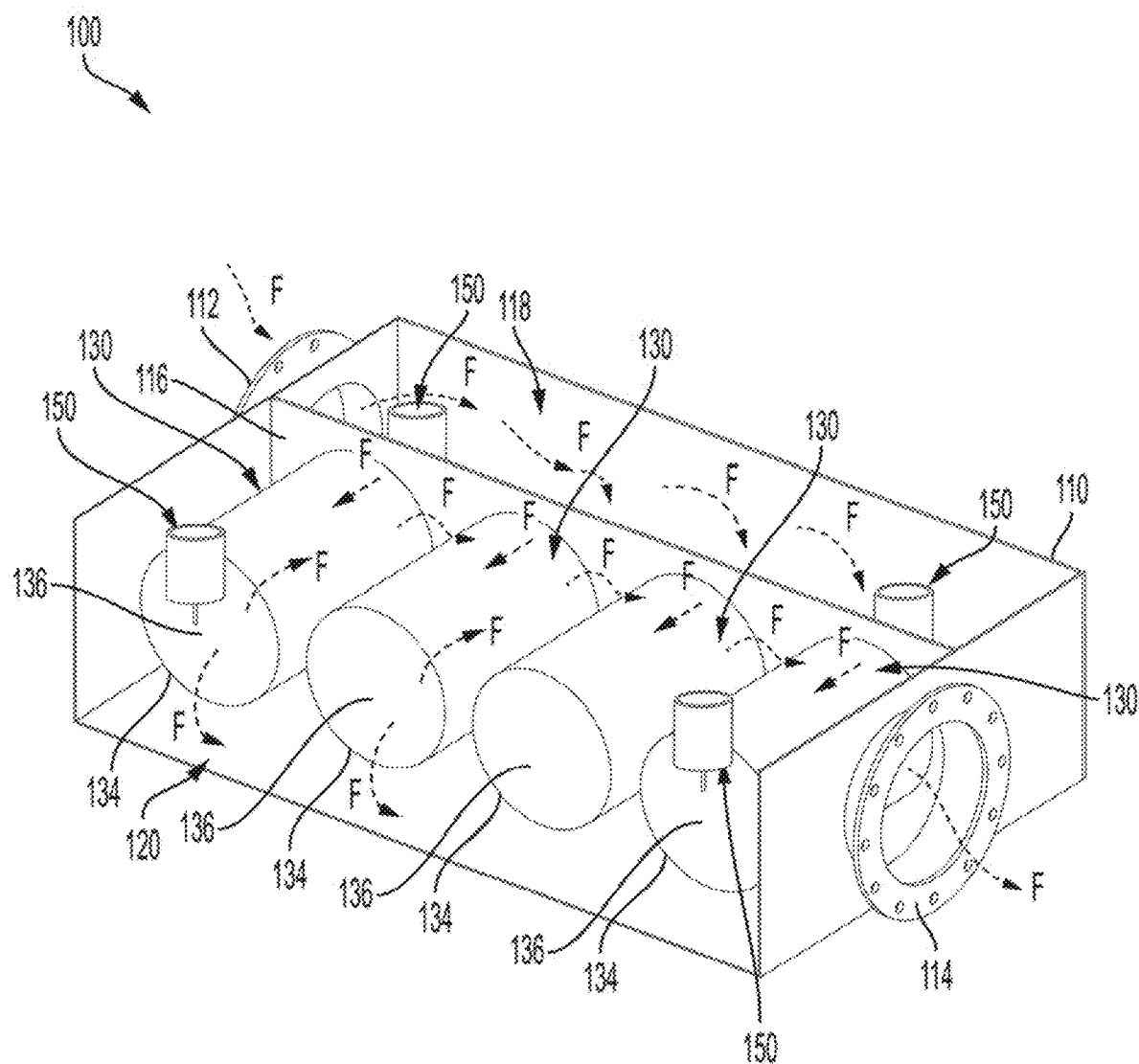
FIG. 1 is a perspective view of a multi-path aftertreatment module according to one or more embodiments of the disclosed subject matter.
Figure 2:
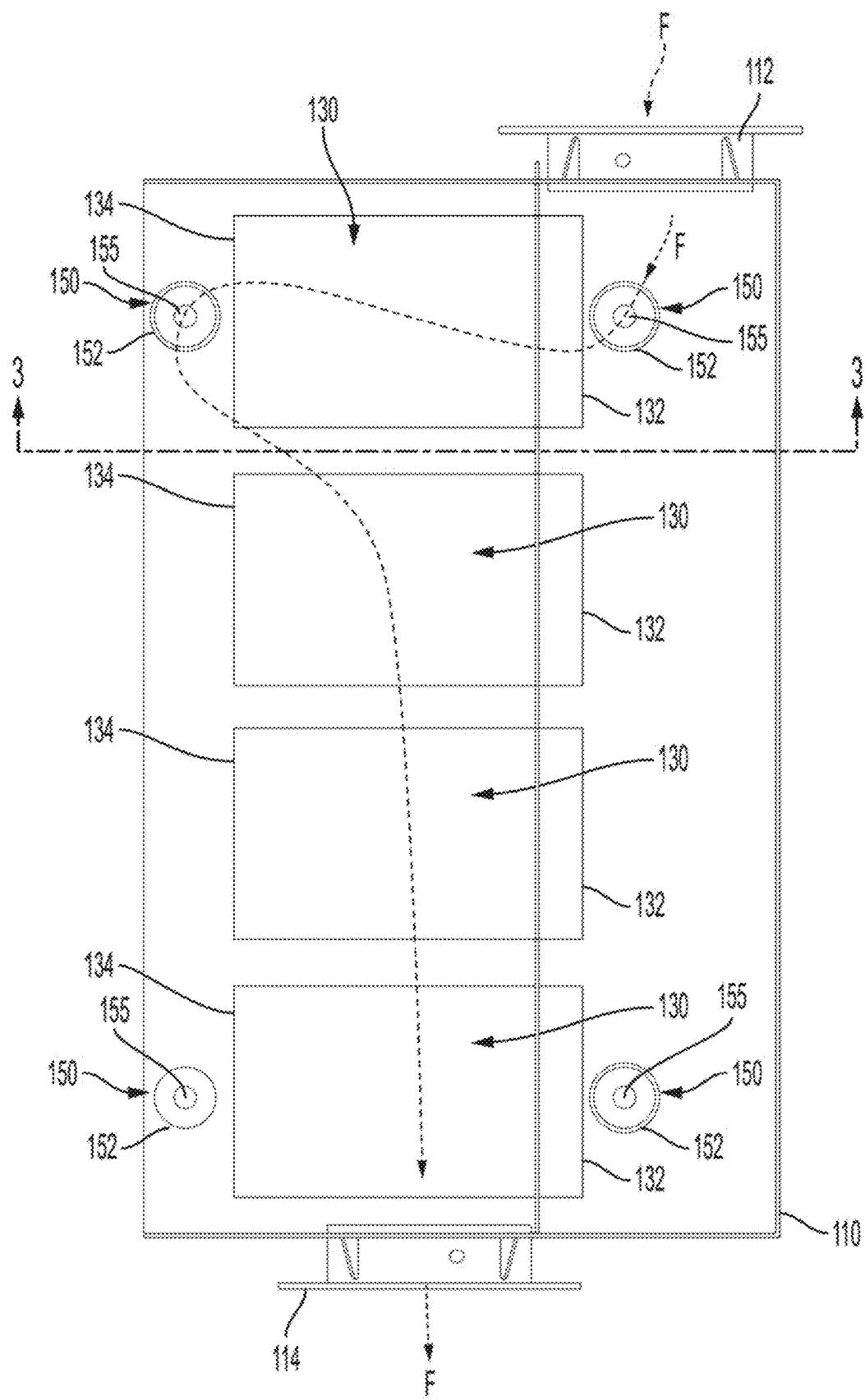
FIG. 2 is an overhead view of the multi-path aftertreatment module of FIG. 1.
Figure 3:
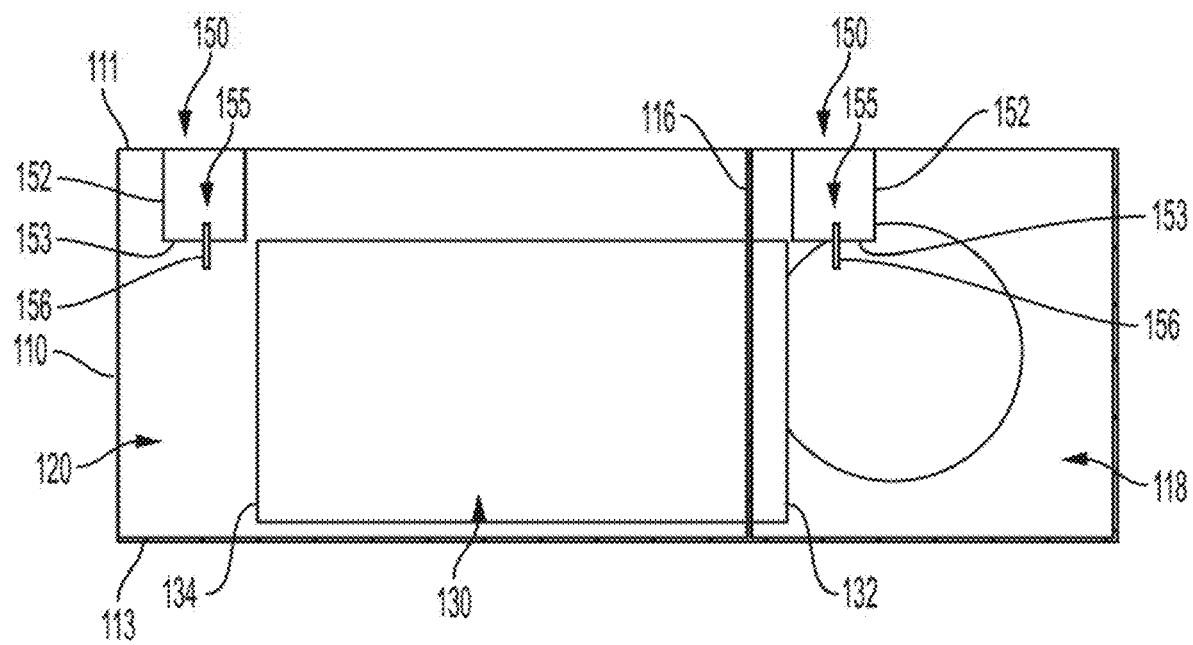
FIG. 3 is a sectional view of the multi-path aftertreatment module of FIG. 1 along the line 3-3 in FIG. 2.

FIGS. 1-3 show an aftertreatment module 100, which may be referred to or characterized as a clean emissions module (CEM), according to one or more embodiments of the disclosed subject matter. The aftertreatment module 100 can be comprised of an exhaust enclosure 110, a plurality of particulate filters 130, and one or a plurality of radio frequency (RF) sensor sets comprised of two RF sensors 150. The aftertreatment module 100 can be configured or characterized as a multi-pass or -path aftertreatment module 100 because exhaust gas may flow therethrough via multiple parallel paths, particularly multiple parallel paths via the plurality of particulate filters 130.

The exhaust enclosure 110 can include a plurality of sidewalls depending upon the geometrical configuration thereof. Here, FIGS. 1-3 show that the exhaust enclosure 110 can be rectangular in form, however, embodiments of the disclosed subject matter can include alternative geometrical configurations such as cube or a differently shaped rectangular cuboid. In this regard, the sidewalls can include a top or roof sidewall 111 and a bottom or floor sidewall 113 opposite the top sidewall 111 and front, rear, and end sidewalls therebetween. Note that in FIG. 1 and FIG. 2 the top sidewall 111 opposite the bottom sidewall (i.e., floor or bottom) 113 is not shown; however, FIG. 3 shows the top sidewall 111. Though FIGS. 1-3 show a horizontal installation embodiments of the disclosed subject matter are not so limited and may be directed to a vertical installation. Such installations can involve horizontal only flow of exhaust gas, vertical only flow of exhaust gas, or a combination of horizontal flow and vertical flow or exhaust gas.

The exhaust enclosure 110 can also have an inlet port 112 to receive exhaust gas from an engine (e.g., a diesel engine) and an outlet port 114 to output from the exhaust enclosure 110 exhaust gas treated or conditioned within the exhaust enclosure 110. Though the exhaust enclosure 110 shows one inlet port 112 embodiments of the disclosed subject matter are not so limited. That is, embodiments of the disclosed subject matter can include multiple inlet ports 112, for instance, two inlet ports 112. Optionally, only one outlet port 114 may be provided, for instance, the outlet port 114. Alternatively, more than one outlet port 114 may be provided.

Additionally, though FIGS. 1-3 show the inlet port 112 and the outlet port 114 on opposite sidewalls of the exhaust enclosure 110, the inlet port 112 and the outlet port 114 can be on sidewalls other than those shown in FIGS. 1-3. For instance, the inlet port 112 may be located on bottom sidewall 113 and the outlet port 114 may be located on the top sidewall 111.

Exhaust gas from the engine can be provided inside an internal volume of the exhaust enclosure 110 via the inlet port 112. Likewise, exhaust gas treated or conditioned by the aftertreatment module 100 can be output from the exhaust enclosure 110 via the outlet port 114. According to embodiments of the disclosed subject matter, the flow F of exhaust gas from the inlet port or ports to the outlet port or ports can be the only way the exhaust gas can enter and exit the exhaust enclosure. For instance, regarding the exhaust enclosure 110, the flow F of exhaust gas from the inlet port 112 to the outlet port 114 can be the only way exhaust gas can enter and exit the exhaust enclosure 110. Thus, the exhaust enclosure 110 may sealingly enclose the exhaust gas when the exhaust gas is passing therethrough, except for the exhaust gas passages at the inlet port 112 and the outlet port 114.

The exhaust enclosure 110 may have therein a first compartment or chamber 118 and a second compartment or chamber 120. The first compartment 118 can be in direct fluid communication with the inlet port 112, and the second compartment 120 can be in direct fluid communication with the outlet port 114. The first compartment 118 can be fluidly separated from the second compartment 120 at least by the plurality of particulate filters 130. Optionally, a wall or divider 116 may additionally fluidly separate the first compartment 118 from the second compartment 120. Here, according to embodiments of the disclosed subject matter, exhaust may flow from the first compartment 118 to the second compartment 120 via only the particulate filters 130.

As shown in FIG. 1 and FIG. 2, the particulate filters 130 can be arranged in parallel with each other within the exhaust enclosure 110. In this regard, respective inlets 132 of the particulate filters 130, which may be referred to herein as first ends or first faces (of the particulate filters 130) can be provided in the first compartment 118. Likewise, respective outlets 134 of the particulate filters 130, which may be referred to herein as second ends or second faces (of the particulate filters 130) can be provided in the second compartment 120. Optionally, the path of the exhaust gas flow F through the particulate filters 130 can be offset relative to the path of the exhaust gas flow F through the inlet port 112 and/or the outlet port 114 (e.g., perpendicular flow paths), depending upon the configuration and orientation of the particulate filters 130 and the inlet port 112 and the particulate filters 130 and the outlet port 114.

In any event, according to one or more embodiments, the exhaust gas can flow through the particulate filters 130 in parallel from the first compartment 118 to the second compartment 120. Hence, as noted above, and as shown in FIG. 1 and FIG. 2, the parallel particulate filters 130 can be characterized as providing multiple exhaust flow paths or passes for the exhaust gas flow F from the first compartment 118 to the second compartment 120. Thus, as the exhaust gas flow F enters the exhaust enclosure 110 via the inlet port 112 (or inlet ports), the exhaust gas flow F can be split into different flow paths pursuant to the number of particulate filters 120. Though FIGS. 1-3 show the particulate filters 130 arranged to treat a horizontal flow of the exhaust gas, embodiments of the disclosed subject matter can also include particulate filters 130 oriented to accommodate a vertical or other directional flow of the exhaust gas from the first compartment 118 to the second compartment 120.

Discussed in more detail below, though the exhaust gas may pass through each of the particulate filters 130, the exhaust gas flow F may not be the same for the different particulate filters 130. For instance, at least one of the particulate filters 130 may be predetermined to be able to process a highest or greatest amount of the exhaust gas flow F relative to other non-highest particulate filters 130 and at least one of the particulate filters 130 may be predetermined to be able to process a lowest or least amount of the exhaust gas flow F relative to other non-least particulate filters 130. Here, the flow characteristics of the exhaust gas flow F may be based on the size of the exhaust enclosure 110 or components thereof and/or placement of the components within the exhaust enclosure 110. Such sizing and/or placement can be applicable to the inlet port 112, the outlet port 114, the first compartment 118, the second compartment 120, and the particulate filters 130.

According to embodiments of the disclosed subject matter, the particulate filters 130 can be arranged in an array within the exhaust enclosure 110. Such array may be in the form of a multi-row and/or multi-column array. FIGS. 1-3, for instance, show an array of particulate filters 130 with one row and four columns. However, embodiments of the disclosed subject matter are not so limited. For example, according to one or more embodiments number of particulate filters 130 can be fifteen arranged in a 3×5 or 5×3 array.

Each of the particulate filters 130 can be comprised of a body or housing and a filter portion (or portions) 136 comprised of filtering material or medium inside the housing (e.g., ceramic and/or metallic filter medium(s)). Optionally, the particulate filter 130, particularly the housing and filter portion 136 thereof, may be referred to as a can and a brick, respectively. Though FIGS. 1-3 show the housings of the particulate filters 130 (and corresponding filter portions 136) being cylindrical, embodiments of the disclosed subject matter are not so limited. For instance, the housings of the particulate filters 130 (and corresponding filter portions 136) can be cuboid, rectangular cuboid, etc. According to one or more embodiments of the disclosed subject matter, the particulate filter 130 can be configured to provide filtering for diesel engine exhaust gas. Hence, according to one or more embodiments, the particulate filters 130 can be diesel particulate filters (DPFs).

Optionally, the particulate filters 130 may have components other than the filter portion 136 in the housing. For instance, the particulate filters 130 can include an oxidation catalyst, a SCR/NOx reduction catalyst, and/or other aftertreatment components in the housings thereof. According to one or more embodiments, the particulate filters 130 can be adapted to process absorbed gaseous species.

As noted above, each of the one or multiple RF sensor sets can be comprised of two RF sensors 150. Moreover, according to one or more embodiments each RF sensor set may consist of the two of the RF sensors 150. One of the RF sensors 150 of the RF sensor set may be a transmitting RF sensor 150 and the other of the RF sensors 150 of the RF sensor set may be a receiving RF sensor 150. Generally, according to embodiments of the disclosed subject matter, the transmitting RF sensor 150 may transmit RF signals through a corresponding particulate filter 130, and the transmitted RF signals may be sensed by the receiving RF sensor 150. Such transmitting and receiving RF signals can be used to sense or detect soot, ash, and/or absorbed gaseous species relative to the corresponding particulate filter 130.

According to embodiments of the disclosed subject matter, a first RF sensor 150 of the RF sensor set can be provided in the first compartment 118 of the exhaust enclosure 110 and a second RF sensor 150 of the RF sensor set can be provided in the second compartment 120 of the exhaust enclosure 110. The RF sensor 150 more upstream in the flow path F of the exhaust gas through the aftertreatment module 100 can correspond to a transmitter or transmitting RF sensor 150 and the RF sensor 150 more downstream in the flow path F of the exhaust gas can correspond to a receiver or receiving RF sensor 150. In the aftertreatment module 100 of FIGS. 1-3, each RF sensor 150 in the first compartment 118 can correspond to the transmitter or transmitting RF sensor 150 of one RF sensor set and each RF sensor 150 in the second compartment 120 can correspond to the receiver or receiving RF sensor 150 of one RF sensor set. Alternatively, the roles of the RF sensors 150, i.e., the transmitting and the receiving, can be reversed relative to the flow path F of the exhaust gas through the aftertreatment module 100.

According to one or more embodiments of the disclosed subject matter, each RF sensor set can be associated with a corresponding one of the particulate filters 130. Optionally, each RF sensor set can be associated with only the corresponding one of the particulate filters 130. In this regard, one of the RF sensors 150 can be provided relative to the inlet 132 of the corresponding particulate filter 130 and the other of the RF sensors 150 can be provided relative to the outlet 134 of the same corresponding particulate filter 130. Such RF sensor set may thus not be provided relative to the inlets 132 and outlets 134 of any of the other particulate filters 130 such that the RF sensor set can sense characteristics specific to the other particulate filters 130. That is, the RF sensor set, according to one or more embodiments of the present disclosure, may sense characteristics specific to only the one particulate filter 130.

For example, as shown in FIGS. 1-3, two RF sensor sets can be provided, one associated with one particulate filter 130 at one end of the exhaust enclosure 110 and another associated with another particulate filter 130 at an opposite end of the exhaust enclosure 110. Notably, the transmitting RF sensors 150 in the first compartment 118 can be provided at respective inlets 132 of the particulate filters 130 at opposite ends of the exhaust enclosure 110 and not any of the inlets 132 of the middle particulate filters 130. Likewise, the receiving RF sensors 150 in the second compartment 120 can be provided at respective outlets 134 of the particulate filters 130 at the opposite ends of the exhaust enclosure 110 and not any of the outlets 134 of the middle particulate filters 130.

Figure 4:
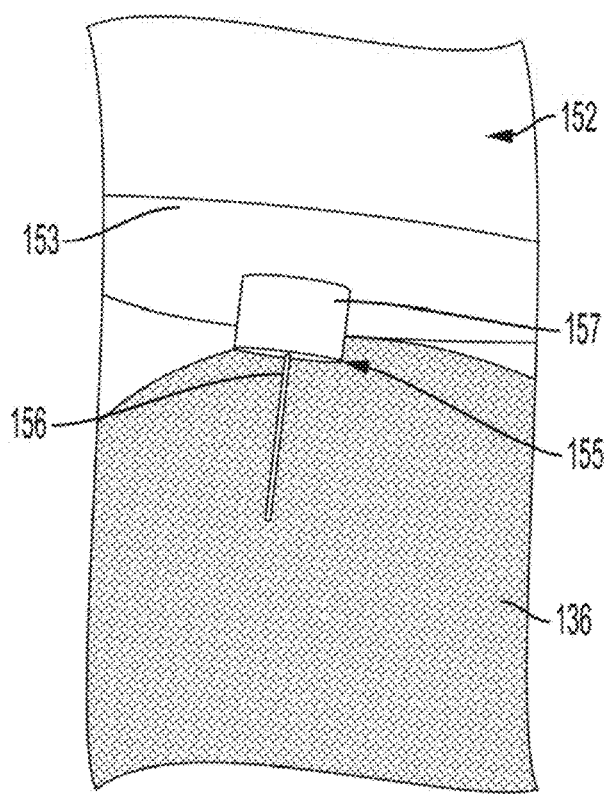
FIG. 4 shows a portion of a radio frequency (RF) sensor assembly relative to a particulate filter in a multi-path aftertreatment module according to one or more embodiments of the disclosed subject matter.
Figure 5:
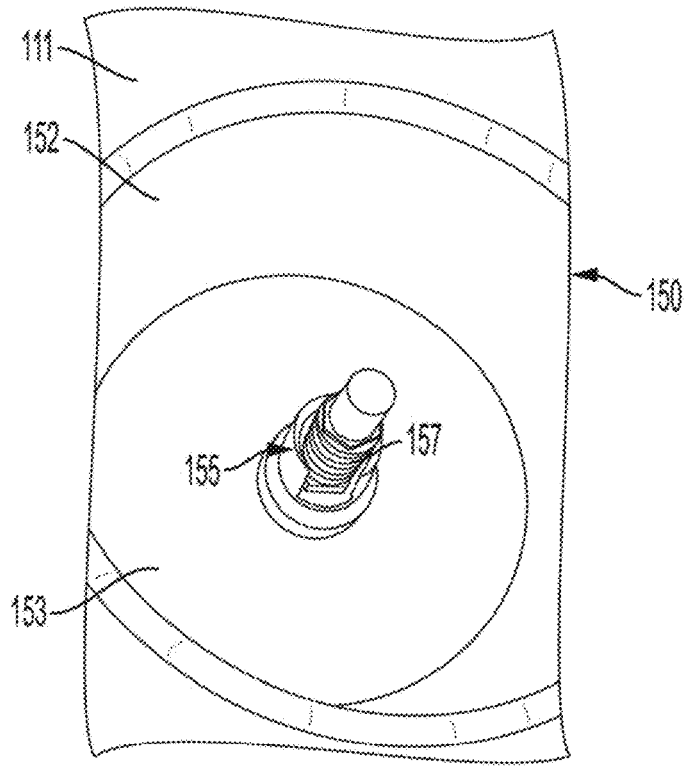
FIG. 5 shows a top view of the RF sensor assembly of FIG. 4.

Each of the RF sensors 150 can be comprised of a housing 152 and an antenna 156. The antenna 156 may be removably coupled to the housing 152, via a connection interface (e.g., threaded, snap fit, etc.) with the housing 152, for instance, in the event that the antenna 156 needs to be replaced. From the antenna side the connection interface may include an antenna interface 157, such as shown in FIG. 4 and FIG. 5. Hence, the RF sensors 150 may be referred to herein as RF sensor assemblies 150. Moreover, each of the transmitting RF sensor 150 and the receiving RF sensor 150 may be referred to as an RF transmitter assembly 150 and an RF receiver assembly 150, respectively.

As noted above, at least one of the particulate filters 130 may be predetermined (e.g., via simulation of the exhaust flow distribution through the aftertreatment module 100) to process a highest or greatest amount of the exhaust gas flow F relative to other non-highest particulate filters 130 and at least one of the particulate filters 130 may be predetermined (e.g., via simulation of the exhaust flow distribution through the aftertreatment module 100) to process a lowest or least amount of the exhaust gas flow F relative to other non-least particulate filters 130. In this regard, an RF sensor set may be placed relative to the particulate filter 130 (or filters) predetermined to process the highest or greatest amount of the exhaust gas flow F relative to other non-highest particulate filter(s) 130. Optionally, the RF sensor set (or sets) may be placed only relative to the particulate filter 130 (or filters) predetermined to process the highest or greatest amount of the exhaust gas flow F. Alternatively, RF sensor sets can be placed relative to the particulate filter 130 (or filters) predetermined to process the highest or greatest amount of the exhaust gas flow F and the particulate filter 130 (or filters)

predetermined to process a lowest or least amount of the exhaust gas flow F relative to other non-least particulate filters 130.

The RF sensors 150 may be provided such that the antennas 156 thereof are predetermined distances away from the respective faces of the inlet 132 and outlet 134 of the particulate filter 130 in a length direction of the particulate filter 130. The predetermined distances may be the same for the antennas 156 for the inlet 132 and outlet 134 sides of the particulate filter 130. Alternatively, the distances may be different. For instance, the predetermined distance for at least the antenna 156 at the outlet 134 of the particulate filter 130 can be ½ inch to 3 inches (inclusive) away from the face of the outlet 134. According to one or more embodiments, the antenna 156 at the outlet 134 may not contact the face of the particulate filter 130 at the outlet 134, particularly where the filter portion 136 is flush or essentially flush with the face of the particulate filter 130 at the outlet 134. Such predetermined distance may also apply to the antenna 156 at the inlet 132 of the particulate filter 130. According to one or more embodiments, the dimensions of the housing 152 of the RF sensor 150 and corresponding positioning of the housing 152 may define how close the antenna 156 can be positioned relative to the particular face of the particulate filter 130. That is, a radius of a bottom wall 153 of the housing 152, i.e., a distance from a center of the housing 152 from where the antenna 156 extends to the sidewall of the housing 152 may be the closest the antenna 156 can be provided relative to the inlet 132 or the outlet 134 of the particulate filter 130.

Each of the RF sensors 150 can be provided from a sidewall of the exhaust enclosure 110. FIG. 3, for instance, shows each of the RF sensors 150 being provided from the top sidewall 111. Thus, according to embodiments of the disclosed subject matter the RF sensors 150 can be provided from the same sidewall. Additionally or alternatively, one or more RF sensors 150 may be provided from one sidewall (e.g., the top sidewall 111) and one or more RF sensors 150 may be provided from another sidewall (e.g., the bottom sidewall 113). Generally, the sidewall from which the RF sensor 150 is provided can be based on the configuration of the exhaust enclosure 110, the number of particulate filters 130, and/or the arrangement of particulate filters 130. In the case of a multi-row and multi-column array of particulate filters 130, each or some of the RF sensor sets can be arranged at a respective edge of the array. Thus, in such a case the one or more internal particulate filters 130 of the array may not have associated therewith a RF sensor set.

According to one or more embodiments of the disclosed subject matter, the housing 152 of the RF sensor 150, which can be made of metal, can be fixed to the sidewall of the exhaust enclosure 110. For instance, the housing 152 can be welded to the exhaust enclosure 110. FIG. 4 shows an exemplary configuration whereby a top portion of the housing 152 is welded to the exhaust enclosure 110, in this example the top sidewall 111. In this regard, a corresponding hole or opening in the exhaust enclosure 110 may be provided to receive the housing 152 and fixedly couple the top portion of the housing 152 once the rest of the housing 152 has been provided through the opening. Though FIGS. 1-3 and 5 show the housing 152 for the RF sensor 150 being cylindrical, embodiments of the disclosed subject matter are not limited to cylindrical housings and may include other geometrical configurations such as cuboid, rectangular cuboid, geometrical oval, etc.

According to one or more embodiments, the top or upper side of the housing 152 can be open to provide access to an antenna assembly 155 having the antenna 156 (and the antenna interface 157). Thus, one or more embodiments of the disclosed subject matter may provide access to the antenna assembly 155 without having to remove the corresponding sidewall to which the antenna assembly 155 is provided (via the housing 152). Incidentally, a portion of the antenna assembly 155 shown in FIG. 5 extending from the antenna interface 157 can connect to electrical wiring for communication of signals to and/or from the antenna assembly 155, such as control signals (e.g., in the case of the transmitting RF sensor 150) and sensing signals (e.g., in the case of the receiving RF sensor 150).

The housing 152 can extend from the sidewall of the exhaust enclosure 110 into the internal volume of the exhaust enclosure 110, in the corresponding first compartment 118 or the second compartment 120. As shown in FIG. 3 and FIG. 4, a portion of the antenna assembly 155 can also extend into the internal volume of the corresponding first compartment 118 or second compartment 120. FIG. 4, for instance, shows a portion of the antenna interface 157 and the antenna 156 extending into the internal volume of the exhaust enclosure 110. Notably, the antenna 156 can extend below the bottom wall 153 of the housing 152. In this example, the portion of the antenna interface 157 can extend from the bottom wall 153 and the antenna 156 can extend from the antenna interface 157. Alternatively, the antenna 156 can extend from the bottom wall 153 of the housing 152 without the antenna interface 157 also extending from the bottom wall 153.

The RF sensors 150 may also be provided such that the antennas 156 thereof overlap the filter portion 136 of the particulate filter 130 in an end view of the particulate filter 130. That is, the housing 152 can extend into the internal volume of the exhaust enclosure 110 far enough such that the antenna 156 (an entirety thereof or substantially all of the antenna) is in the same plane as the filter portion 136 of the particulate filter 130 (i.e., past the housing of the particulate filter 130). For instance, FIG. 4 shows an exemplary antenna 156 extending so as to overlap or be in the same plane as the filter portion 136 of an exemplary particulate filter 130.

Figure 6:
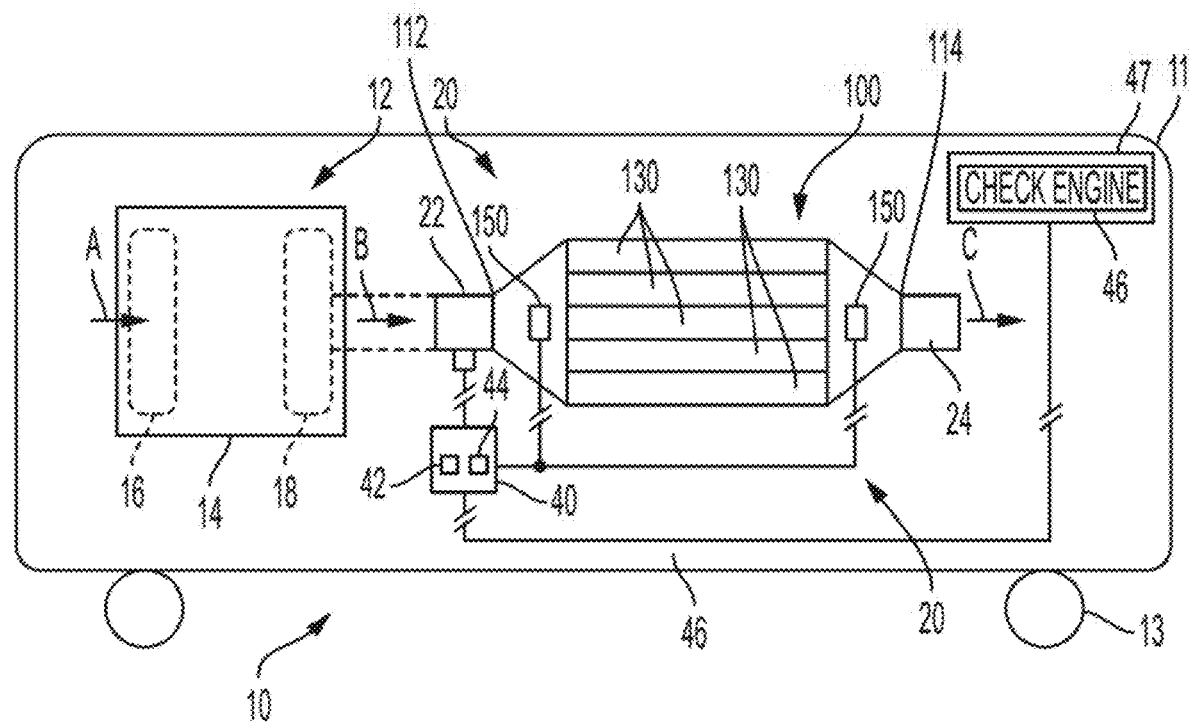
FIG. 6 is a block diagram of a machine implementing a multi-path aftertreatment module according to one or more embodiments of the disclosed subject matter.

Turning now to FIG. 6, FIG. 6 is a block diagram of a machine 10 implementing a multi-path or -pass aftertreatment module according to one or more embodiments of the disclosed subject matter, such as aftertreatment module 100 discussed above.

Machine 10 may be a mobile machine such as an on-highway or off-highway truck having a frame 11 and a set of ground engaging propulsion elements 13 operatively coupled with the frame 11. Embodiments of the disclosed subject matter are not limited to trucks and the machine 10 may alternatively be another mobile machine such as a motor grader, a compactor, a scraper, a tractor, a marine vessel, or even a bus or recreational vehicle. Nor are embodiments of the disclosed subject matter limited to mobile machines. Rather, machine 10 can be a stationary machine such as a genset, a pump, a compressor, or any of a variety of other stationary machines (including those in the marine context).

Machine 10 may include an internal combustion engine system 12, such as a compression ignition diesel engine system or a diesel/natural gas blended engine system, mounted to the frame 11. Engine system 12 may include an internal combustion engine 14, such as a compression ignition diesel engine or a diesel/natural gas blended engine, having an intake manifold 16 and an exhaust manifold 18 coupled therewith. The machine 10 can also have an exhaust system 20. The exhaust system 20 can have an aftertreatment module according to embodiments of the disclosed subject matter, such as aftertreatment module 100. An exhaust conduit 22, which may be referred to herein as a first exhaust conduit 22, can be coupled to the inlet port 112 of the aftertreatment module 100. Similarly, an exhaust conduit 24, which may be referred to herein as a second exhaust conduit 24, can be coupled to the outlet port 114 of the aftertreatment module 100. Thus, the exhaust conduit 22 can provide exhaust from the engine 14 to the aftertreatment module 100 and treated exhaust gas can be output from the aftertreatment module 100 via the outlet port 114 to the exhaust conduit 24. In FIG. 6, arrows A, B, and C identify an approximate flow path for respective gases entering engine 14, passing into the aftertreatment module 100, and exiting from the aftertreatment module 100, respectively.

Electronic control circuitry 40, which may be an electronic control module (ECM) or an electronic control unit (ECU), can be provided. Such electronic control circuitry 40 may be referred to herein simply as a controller 40 or control circuitry. The controller 40 can include a processor 42 and a computer readable memory 44 coupled with the processor 42. Memory 44 may store computer executable instructions to perform one or more operations or methods as described herein, such as detecting soot, ash, and/or absorbed gaseous species and/or control engine 14 and/or engine exhaust system 20 based on the detection operation. Optionally, an indicating device 46 such as a service indicator can be controllably coupled with the controller 40. In one embodiment, indicating device 46 may include a check engine light positioned in an instrument panel within an operator control station 47 such as a cab of the machine 10. The controller 40 optionally may be used to control thermal management without involvement by an operator of the machine 10 (optionally even without knowledge by the operator) using outputs from the RF sensors 150.

The engine 14, which may be a diesel engine as noted above, can be of relatively large displacement size. For instance, the displacement size of the engine 14 can be 9.3 liters or above, for instance, from 9.3 liters to 18 liters (inclusive) or from 9.3 liters to above 18 liters. Alternatively, the displacement size of the engine 14 can be 18 liters or above. Based on the size of the engine 14, the exhaust system 20 may be required to provide back pressure no greater than a predetermined amount. Here, in that embodiments of the disclosed subject matter can implement an aftertreatment module 100 with a plurality of particulate filters 130 in parallel, the aftertreatment module 100 can limit back pressure for the engine 14 to no greater than 20 to 25 kPa (gauge pressure) inclusive, for instance.

The controller 40 can also be operatively coupled to the RF sensors 150. As noted above, the RF sensors 150 can be connected to the controller 40 (e.g., via wiring) to communicate signals to and/or from the antenna assembly 155 of the RF sensors 150. Such signaling can include control signals (e.g., in the case of the transmitting RF sensor 150) and sensing signals (e.g., in the case of the receiving RF sensor 150).

The controller 40 can receive signals from the receiving RF sensor 150 and process the signals to determine one or more characteristics of soot, ash, and/or absorbed gaseous species in the multi-pass aftertreatment module 100. Such characteristics can be applicable to the flow of the exhaust gas F through the aftertreatment module 100 and/or specific to only the corresponding particulate filter 130. For instance, according to one or more embodiments, the controller 40 can process the signals from the receiving RF sensor 150 to determine an actual loading of soot, ash, and/or absorbed gaseous species for the corresponding particulate filter 130. In the case of multiple RF sensor sets, the controller 40 can process the received signals from all of the receiving RF sensors 150 to determine one or more characteristics of soot, ash, and/or absorbed gaseous species in the multi-pass aftertreatment module 100 generally and/or specific to each particulate filter 130. According to one or more embodiments, such processing can determine an average characteristic, such as average loading (e.g., soot and/or ash loading).

According to one or more embodiments, the controller 40 perform control operations to mitigate a characteristic of the soot, ash, and/or absorbed gaseous species based on the processing of the signals from the receiving RF sensor 150. Such operations can include controlling the engine 14, controlling a portion of the exhaust system 20, particularly an aftertreatment portion thereof, and/or controlling the indicating device 46.

For instance, the signaling from the one or more receiving RF sensors 150 processed by the controller 40 can be used to create a calibration curve (or curves) for the soot, ash, and/or absorbed gaseous species. Then, the calibration curve can be referred to by the controller 40, for instance, in real time to control the engine 14 and/or a component of the exhaust system 20 based on signaling from the one or more RF sensors 150 regarding a current condition for the soot, ash, and/or absorbed gaseous species as translated to the previously created calibration curve(s).

According to one or more embodiments, the controller 40, upon determining that a characteristic of the soot, ash, and/or absorbed gaseous species is undesirable can control remedial actions to mitigate the characteristic as noted above. As an example, if the controller 40 determines, based on the feedback signaling from the one or more receiving RF sensors 150, that the loading of the soot or ash is greater than a predetermined threshold, the controller 40 can control components of the exhaust system 20 to rectify the condition. For instance, the controller 40 may initiate operation of a thermal event (e.g., an autoignition component) to remove the accumulated soot from one or more the particulate filters 130 until the soot or ash loading is at least below the predetermined threshold. Additionally or alternatively, the controller 40 can control an output (e.g., an alert) on the indicating device 46 to identify the situation to an operator of the machine 10.

The controller 40, which as noted above may be referred to or characterized as an electronic control module or unit (ECM/ECU), can include the processor 42 (or multiple processors such as microprocessor(s)) for executing specified programs that can control and/or monitor various functions associated with operation of the machine 10. The controller 40 may include the memory 44, as noted above, which can be or include a read only memory (ROM) that may store a program or multiple programs, as well as a random access memory (RANI) that may serve as a working memory area for use in executing the program(s) stored in the memory 44. The controller 40 may also have or otherwise be operatively connected to input/output interfaces (e.g., software-implemented logic or input/output circuitry, such as an output driver) to receive signals from and/or send signals to various components of the machine 10 such as the RF sensors 150.

The controller 40, or portions thereof (e.g., the processor 42), can be implemented using circuitry. As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus to perform various functions); and (c) to circuits, such as a microprocessor(s) or a portion of a microprocessor(s), that require software or firmware for operation, even if the software or firmware is not physically present.

INDUSTRIAL APPLICABILITY

As noted above, the present disclosure relates to engine aftertreatment, and more particularly to engine aftertreatment systems with a multi-pass or -path aftertreatment module and one or more radio frequency (RF) sensors, and methods, assemblies, and components thereof.

Generally, embodiments of the disclosed subject matter can implement one or more RF sensor sets in a multi-pass or -path aftertreatment system or module to detect, in real time, for instance, characteristics of soot, ash, and/or absorbed gaseous species in the aftertreatment system or module. According to one or more embodiments, the engine can be of a predetermined size and configured to be suitably operational with a relatively low back pressure provided by the exhaust system, particularly the aftertreatment system or module thereof. Non-limiting examples of size include 9.2 liter to 18 liter displacement engines and above and back-pressure can be no greater than 20 to 25 kPa (gauge pressure) inclusive.

One or more embodiments of the present disclosure can pertain to usage of radio frequency (RF) sensors for detecting soot and/or ash for diesel particulate filter (DPFs) in an aftertreatment system. A plurality of radio frequency sensors can be used to measure the soot and/or ash for engines, for instance, such as engines having capacity 18 liters or more. As an example, each radio frequency sensor can be equipped with a cylindrical, square, or rectangular shaped bucket or can, for support over the diesel particulate filters. One end of each bucket can be welded onto a clean emissions module (CEM), such as aftertreatment module 100, and the bucket can be aligned on uppermost line of the diesel particulate filter face. Various insulation means may also be provided to protect the sensors from high temperature.

According to embodiments of the disclosed subject matter, implementing soot, ash, and/or absorbed gaseous species tracking can be relatively more accurate, especially when compared to flow rate methodologies. Moreover, such tracking implementation can inform customers (e.g., an operator of the machine 10) when the aftertreatment system or components reliant thereon is/are at risk of damage. Such alert can be processed automatically or manually to alter operation of the machine to mitigate the risk. As noted above, embodiments of the disclosed subject matter may also be paired with or otherwise include some form of thermal management to transparently manage soot, ash, and/or absorbed gaseous species loading.

As noted above, a controller, such as controller 40, can also be operatively coupled to each of one or more RF sensor sets respectively associated with the inlets and outlets of corresponding particulate filters, such as particulate filters 130.

The controller 40 can receive signals from each receiving RF sensor 150 of the set or sets of RF sensors and process the signals to determine one or more characteristics of soot, ash, and/or absorbed gaseous species in the aftertreatment module 100. Such characteristics can be applicable to the flow of the exhaust gas through the aftertreatment module 100 or specific to only the corresponding particulate filter 130. For instance, according to one or more embodiments, the controller 40 can process the signals from the receiving RF sensor 150 to determine an actual loading of the soot, ash, and/or absorbed gaseous species for the particular particulate filter 130. In the case of multiple RF sensor sets, the controller 40 can process the received signals from all of the receiving RF sensors 150 to determine one or more characteristics of soot, ash, and/or absorbed gaseous species in the multi-pass aftertreatment module 100 generally and/or specific to each particulate filter 130. According to one or more embodiments, such processing can determine an average characteristic, such as average loading (e.g., soot and/or ash loading).

According to one or more embodiments, the controller 40 perform control operations to mitigate a characteristic of the soot, ash, and/or absorbed gaseous species based on the processing of the signals from the receiving RF sensor 150. Such operations can include controlling the engine 14, controlling a portion of the exhaust system 20, particularly an aftertreatment portion thereof, and/or controlling the indicating device 46.

For instance, the signaling from the one or more receiving RF sensors 150 processed by the controller 40 can be used to create a calibration curve (or curves) for the soot, ash, and/or absorbed gaseous species. Then, the calibration curve can be referred to in real time to control the engine 14 or a component of the exhaust system 20 based on signaling from the one or more RF sensors 150 regarding a current condition for the soot, ash, and/or absorbed gaseous species as translated to the previously created calibration curve(s).

According to one or more embodiments, the controller 40, upon determining that a characteristic of the soot, ash, and/or absorbed gaseous species is undesirable, can control remedial actions to mitigate the characteristic as noted above. As an example, if the controller 40 determines, based on the feedback signaling from the one or more receiving RF sensors 150 that the loading of the soot or ash is greater than a predetermined threshold, the controller 40 can control components of the exhaust system 20 to rectify the condition. For instance, the controller 40 may initiate operation of a thermal event (e.g., an autoignition component) to remove the accumulated soot from one or more the diesel particulate filters 130 until the soot or ash loading is at least below the predetermined threshold. Additionally or alternatively, the controller 40 can control an output (e.g., an alert) on the indicating device 46 to identify the situation to an operator of the machine 10.

The RF sensors 150 may be provided such that the antennas 156 thereof are predetermined distances away from the respective faces of the inlet 132 and outlet 134 of the particulate filter 130 in a length direction of the particulate filter 130. For instance, the predetermined distance for at least the antenna 156 at the outlet 134 of the particulate filter 130 can be ½ inch to 3 inches (inclusive) away from the face of the outlet 134. According to one or more embodiments, the antenna 156 at the outlet 134 may not contact the face of the particulate filter 130 at the outlet 134, particularly where the filter portion 136 is flush or essentially flush with the face of the particulate filter 130 at the outlet 134. Such predetermined distance may also apply to the antenna 156 at the inlet 132 of the particulate filter 130. The antennas 156 of the RF sensor 150 at least at the outlet 134 may not be so close as to obstruct the flow of exhaust gas F being output from the particulate filter 130. Such predetermined distance may also be set to provide suitable signal-to-noise ratio (SNR) for the RF sensor set.

Each of the RF sensors 150 can be provided from a sidewall of the exhaust enclosure 110. FIG. 3, for instance, shows each of the RF sensors 150 being provided from the top sidewall 111. Thus, according to embodiments of the disclosed subject matter the RF sensors 150 can be provided from the same sidewall. Additionally or alternatively, one or more RF sensors 150 may be provided from one sidewall (e.g., the top sidewall 111) and one or more RF sensors 150 may be provided from another sidewall (e.g., the bottom sidewall 113). Generally, the sidewall from which the RF sensor 150 is provided can be based on the configuration of the exhaust enclosure 110, the number of particulate filters 130, and/or the arrangement of particulate filters 130. In the case of a multi-row and multi-column array of particulate filters 130, each or some of the RF sensor sets can be arranged at a respective edge of the array. Thus, in such a case the one or more internal particulate filters 130 of the array may not have associated therewith a RF sensor set, wherein such configuration may prevent the housings 152 of antenna assemblies 155 from extending too far into the inner volume of the exhaust enclosure 110 and/or may prevent the need to use exceedingly long antennas to reach the internal particulate filers 130.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An engine aftertreatment system comprising:
electronic control circuitry; and
an exhaust system to receive exhaust gas output from an internal combustion engine, the exhaust system having a multi-path aftertreatment module that includes:
an exhaust enclosure with an inlet port to receive the exhaust gas from the internal combustion engine via a first exhaust conduit downstream of the internal combustion engine, an outlet port to output treated exhaust gas to a second exhaust conduit downstream of the internal combustion engine, a first compartment in fluid communication with the inlet port, a second compartment in fluid communication with the outlet port, and a divider between the first compartment and the second compartment,
a plurality of particulate filters extending in parallel with each other within the exhaust enclosure such that, for each of the plurality of particulate filters, an inlet of the particulate filter is in the first compartment and an outlet of the particulate filter is in the second compartment, and
a radio frequency (RF) sensor set operatively coupled to the electronic control circuitry and comprised of an RF transmitter assembly and an RF receiver assembly, each of the RF transmitter assembly and the RF receiver assembly having a housing and an antenna,
wherein the RF transmitter assembly is provided in the first compartment at the inlet of one of the plurality of particulate filters and not the inlets of any of the other particulate filters of the plurality of particulate filters,
wherein the RF receiver assembly is provided at the outlet of said one of the plurality of particulate filters and not the outlets of said other particulate filters of the plurality of particulate filters, and
wherein said one of the plurality of particulate filters is predetermined to process a greatest exhaust flow through the multi-path aftertreatment module compared to exhaust flow through each of the other particulate filters of the plurality of particulate filters of the multi-path aftertreatment module.

2. The engine aftertreatment system according to claim 1,
wherein the housing of the RF transmitter assembly is provided from a sidewall of the exhaust enclosure such that the antenna of the RF transmitter assembly is spaced from the inlet of said one of the particulate filters by a first predetermined distance in a length direction of said one of the particulate filters and overlaps a filter portion of said one of the particulate filters in an end view of said one of the particulate filters, and
wherein the housing of the RF receiver assembly is provided from the sidewall of the exhaust enclosure such that the antenna of the RF receiver assembly is spaced from the outlet of said one of the particulate filters by a second predetermined distance in the length direction of said one of the particulate filters and overlaps the filter portion of said one of the particulate filters in the end view of said one of the particulate filters.

3. The engine aftertreatment system according to claim 1,
wherein the housing of the RF transmitter assembly is fixed to a sidewall of the exhaust enclosure, and
wherein a top portion of the housing of the RF receiver assembly is fixed to the sidewall of the exhaust enclosure such that the housing of the RF receiver assembly extends into the second compartment and the antenna of the RF receiver assembly extends below a bottom portion of the housing to a position that overlaps a filter portion of said one of the particulate filters in an end view of said one of the particulate filters.

4. The engine aftertreatment system according to claim 1, wherein for each housing of the RF transmitter assembly and the RF receiver assembly an upper end is open to allow access to the antenna without removing a sidewall of the exhaust enclosure to which each housing of the RF transmitter assembly and the RF receiver assembly are fixedly coupled.

5. The engine aftertreatment system according to claim 1, further comprising another said radio frequency (RF) sensor set operatively coupled to the electronic control circuitry,
wherein said another RF sensor set is provided in the exhaust enclosure relative to another of the particulate filters different from said one of the plurality of particulate filters,
wherein said another of the particulate filters is predetermined to provide process a least flow of the exhaust gas through the multi-path aftertreatment module compared to flow of the exhaust gas through each of the other particulate filters of the plurality of particulate filters of the multi-path aftertreatment module, and
wherein the electronic control circuitry is configured to determine an average soot and/or ash amount associated with a flow of the exhaust gas from the inlet port to the outlet port of the multi-path aftertreatment module.

6. The engine aftertreatment system according to claim 1,
wherein the RF sensor set is configured to sense soot, ash, or absorbed gaseous species, and
wherein the electronic control circuitry is configured to process a sensing signal from the RF receiver assembly of the RF sensor set to determine an actual loading of the soot, ash, or absorbed gaseous species, and perform a control operation to mitigate a characteristic of the soot, ash, or absorbed gaseous species in the multi-path aftertreatment module based on the processing of the sensing signal and according to a predetermined calibration curve.

7. The engine aftertreatment system according to claim 1, wherein the internal combustion engine has a capacity of at least 18 L and the exhaust system provides a maximum back gauge pressure of 20 to 25 kPa inclusive.

8. A method implementing a multi-pass aftertreatment module, the method comprising:
providing an exhaust enclosure of the multi-pass aftertreatment module, the exhaust enclosure including an inlet port to receive exhaust gas from an engine, an outlet port to output treated exhaust gas, a first chamber in fluid communication with the inlet port, and a second chamber in fluid communication with the outlet port;
providing a plurality of particulate filters of the multi-pass aftertreatment module arranged in an array of at least one row and multiple columns or multiple rows and at least one column, the plurality of particulate filters extending in parallel with each other within the exhaust enclosure such that, for each of the plurality of particulate filters, an inlet of the particulate filter is in the first chamber and an outlet of the particulate filter is in the second chamber; and
providing a plurality of radio frequency (RF) sensor sets each comprised of an RF transmitter and an RF receiver,
wherein the first chamber and the second chamber are in fluid communication with each other via only the plurality of particulate filters,
wherein each of the RF transmitters are provided in the first chamber at respective inlets of corresponding particulate filters of the plurality of particulate filters,
wherein each of the RF receivers are provided in the second chamber at respective outlets of said corresponding particulate filters of the plurality of particulate filters,
wherein a first particulate filter of the plurality of particulate filters having associated therewith a corresponding first RF sensor set of the plurality of RF sensor sets is predetermined to process a greatest flow of the exhaust gas through the multi-pass aftertreatment module compared to the flow of the exhaust through one or more other particulate filters of the multi-pass aftertreatment module, and
wherein a second particulate filter of the plurality of particulate filters having associated therewith a corresponding second RF sensor set of the plurality of RF sensor sets is predetermined to process a least flow of the exhaust gas through the multi-pass aftertreatment module compared to the flow of exhaust gas through one or more other particulate filters of the multi-pass aftertreatment module.

9. The method according to claim 8, wherein the array of the plurality of particulate filters includes multiple rows and multiple columns.

10. The method according to claim 8, further comprising: providing electronic control circuitry operatively coupled to the plurality of RF sensor sets; and
mitigating a characteristic of soot, ash, or absorbed gaseous species in the multi-pass aftertreatment module based on feedback from the plurality of RF sensor sets,
wherein a maximum back gauge pressure associated with operation of the multi-pass aftertreatment module is 20 to 25 kPa inclusive.

11. The method according to claim 8, further comprising determining, in real time, a characteristic of soot, ash, or absorbed gaseous species in the multi-pass aftertreatment module using signals from the plurality of RF sensor sets using control circuitry.

12. The method according to claim 8, wherein the method further comprises determining an average soot and/or ash amount associated with a first flow and a second flow of the exhaust gas from the inlet port to the outlet port of the multi-pass aftertreatment module via the first particulate filter and the second particulate filter, respectively.

13. An aftertreatment module comprising:
an exhaust enclosure with at least one inlet port to receive exhaust gas from an engine, an outlet port to output treated exhaust gas, a first compartment in fluid communication with the inlet port, and a second compartment in fluid communication with the outlet port;
a plurality of particulate filters extending in parallel with each other within the exhaust enclosure such that, for each of the plurality of particulate filters, an inlet of the particulate filter is in the first compartment and an outlet of the particulate filter is in the second compartment; and
a radio frequency (RF) sensor set including an RF transmitter assembly and an RF receiver assembly, each of the RF transmitter assembly and the RF receiver assembly having a housing and an antenna,
wherein the RF transmitter assembly is provided in the first compartment at the inlet of one of the plurality of particulate filters,
wherein the RF receiver assembly is provided at the outlet of said one of the plurality of particulate filters,
wherein the aftertreatment module is configured to process the exhaust gas such that a flow of the exhaust gas passes from the first compartment to the second compartment via the plurality of particulate filters in parallel with each other,
wherein a first flow path direction associated with the flow of the exhaust gas through the plurality of particulate filters is perpendicular to a second flow path direction associated with flow through the at least one inlet port and a third flow path direction associated with flow through the outlet port, and
wherein said one of the plurality of particulate filters is predetermined to process a greatest exhaust flow through the multi-path aftertreatment module compared to exhaust flow through each of the other particulate filters of the plurality of particulate filters of the multi-path aftertreatment module.

14. The aftertreatment module according to claim 13, wherein the first compartment and the second compartment are in fluid communication with each other via only the plurality of particulate filters.

15. The aftertreatment module according to claim 13, wherein the housing of the RF transmitter assembly is provided from a sidewall of the exhaust enclosure such that the antenna of the RF transmitter assembly is spaced from the inlet of said one of the plurality of particulate filters by a first predetermined distance in a length direction of said one of the plurality of particulate filters and overlaps a filter portion of said one of the plurality of particulate filters in an end view of said one of the plurality of particulate filters, and wherein the housing of the RF receiver assembly is provided from the sidewall of the exhaust enclosure such that the antenna of the RF receiver assembly is spaced from the outlet of said one of the plurality of particulate filters by a second predetermined distance in the length direction of said one of the plurality of particulate filters and overlaps the filter portion of said one of the plurality of particulate filters in the end view of said one of the plurality of particulate filters.

16. The aftertreatment module according to claim 13,
wherein the housing of the RF transmitter assembly is fixedly connected to a sidewall of the exhaust enclosure, and
wherein a top portion of the housing of the RF receiver assembly is fixedly connected to the sidewall of the exhaust enclosure such that the housing of the RF receiver assembly extends into the second compartment and the antenna of the RF receiver assembly extends below a bottom portion of the housing of the RF receiver to a position that overlaps a filter portion of said one of the plurality of particulate filters in an end view of said one of the plurality of particulate filters.

17. The aftertreatment module according to claim 13,
wherein the plurality of particulate filters are provided in a multi-row and multi-column array,
wherein the RF sensor set is part of a plurality of said RF sensor sets, and
wherein each of the plurality of RF sensor sets is associated with only one corresponding particulate filter, each of the only one corresponding particulate filters being located at an edge of the multi-row and multi-column array of the plurality of particulate filters.

18. The aftertreatment module according to claim 13,
wherein the at least one inlet port includes at least two inlet ports and the outlet port is the only outlet port of the exhaust enclosure, and
wherein a maximum gauge back pressure associated with operation of the aftertreatment module is 20 to 25 kPa inclusive.

* * * * *